United States Patent [19]

Sprunk

[11] Patent Number: 5,385,712
[45] Date of Patent: Jan. 31, 1995

[54] MODULAR CHEMICAL REACTOR

[76] Inventor: Darren K. Sprunk, 12767 Archery Dr., Baton Rouge, La. 70815

[21] Appl. No.: 163,900

[22] Filed: Dec. 7, 1993

[51] Int. Cl.⁶ .............................. B01J 8/04; B01J 19/00
[52] U.S. Cl. ........................................ 422/190; 422/49; 422/129; 422/191; 422/196; 422/197; 422/241
[58] Field of Search ................. 422/49, 129, 190, 191, 422/192, 196, 197, 200, 241

[56] References Cited

U.S. PATENT DOCUMENTS

| | | | |
|---|---|---|---|
| 1,159,865 | 11/1915 | Pier | 422/242 |
| 3,335,160 | 8/1967 | Sennenwald et al. | 422/197 X |
| 3,600,141 | 8/1971 | Mevenkamp et al. | 422/197 X |
| 3,668,108 | 6/1972 | Houseman | 204/323 |
| 3,933,434 | 1/1976 | Matovich | 23/252 R |
| 4,288,409 | 9/1981 | Fedders et al. | 422/219 |
| 4,357,304 | 11/1982 | Pegels et al. | 422/191 |
| 4,446,112 | 5/1984 | Hartog | 422/216 |
| 4,540,547 | 9/1985 | Schuurman | 422/49 |
| 4,556,537 | 12/1985 | Honma | 422/49 |
| 4,585,622 | 4/1986 | Bowe et al. | 422/50 |
| 5,124,133 | 6/1992 | Schoenrock | 422/191 |
| 5,186,904 | 2/1993 | Lyzinski et al. | 422/130 |

FOREIGN PATENT DOCUMENTS 2141043  12/1984  United Kingdom .

*Primary Examiner*—Robert J. Warden
*Assistant Examiner*—Christopher Kim
*Attorney, Agent, or Firm*—Reginald F. Roberts, Jr.

[57] ABSTRACT

A modular chemical reactor. The reactor includes a reactor housing having identical and interchangeable ends, a reaction chamber within the reactor housing, a pair of identical and interchangeable modular seal nuts connected to the ends of the reactor housing, and a pair of double-sided screen seals within the modular seal nuts.

2 Claims, 5 Drawing Sheets

MODULAR CHEMICAL REACTOR

BACKGROUND OF THE INVENTION

The present invention relates to chemical reactors. More particularly, the invention relates to modular chemical reactors having the same outside dimensions and different internal volumes.

Although the prior art includes descriptions of many different types of chemical reactors, there is no provision for varying the internal volume of the reactors within the same-size reactor housing, nor for providing such reactors with interhcangeable screen seals. The present invention addresses and meets these and other needs apparent to those skilled in the art.

SUMMARY OF THE INVENTION

In general, the present invention in one aspect provides a double-sided screen seal for a modular chemical reactor. The modular seal comprises a seal housing, a first seal chamber having first and second ends, a second seal chamber having first and second ends, a convergence chamber having first and second ends, a tubular member connecting the first seal chamber and the convergence chamber to one another, and a flat perforated member disposed between the convergence chamber and the second seal chamber.

The first seal chamber tapers from wide to narrow in a direction from the first end at the periphery of the seal housing to the second end. The tubular member has a substantially uniform width and cross-sectional area. The tubular member connects the second end of the first seal chamber to the first end of the convergence chamber.

The second seal chamber tapers from narrow to wide in a direction from the first end adjacent the perforated member to the second end at the periphery of the seal housing. The second seal chamber is substantially larger than the first seal chamber.

In a second aspect the invention provides a plurality of modular reactors having the same outside diameter and having internal reaction chambers of different inside diameters. The plurality of reactors comprise a first reactor, a first reaction chamber disposed within the first reactor, a second reactor having the same outside diameter as the first reactor, and a second reaction chamber disposed within the second reactor. The second reaction chamber has an internal diameter substantially different from that of the first reaction chamber.

In a third aspect the present invention provides a modular chemical reactor comprising a reactor housing having first and second identical and interchangeable ends. A first modular seal nut is connected to the first end of the reactor housing, and a second modular seal nut to the second end of the reactor housing.

The first and second modular seal nuts are identical and interchangeable. Each seal nut has internal threads. Both ends of the reactor housing have external threads constructed and arranged to mesh with and engage the internal threads on the modular seal nuts.

Each modular seal nut encloses a double-sided screen seal. The screen seal comprises a seal housing, a first seal chamber having first and second ends, a second seal chamber having first and second ends, a convergence chamber having first and second ends, a tubular member connecting the first seal chamber and the convergence chamber to one another, and a flat perforated member disposed between the convergence chamber and the second seal chamber.

The first seal chamber tapers from wide to narrow in a direction from the first end at the periphery of the seal housing to the second end. The tubular member has a substantially uniform width and cross-sectional area. The tubular member connects the second end of the first seal chamber to the first end of the convergence chamber.

The second seal chamber tapers from narrow to wide in a direction from the first end adjacent the perforated member to the second end at the periphery of the seal housing. The second seal chamber is substantially larger than the first seal chamber.

In a fourth aspect the invention provides a method for fabricating modular reactors having the same outside diameter and different internal diameters. The method comprises the following steps:

(a) providing first and second reactors having the same outside dimensions;

(b) disposing a first reaction chamber in the first reactor housing; and (c) disposing a second reaction chamber in the second reactor housing, the second reaction chamber being substantially larger than the first reaction chamber.

DETAILED DESCRIPTION OF THE INVENTION

The term "diameter" as used herein is defined as follows:

For a circular or cylindrical object, the diameter as ordinarily defined; viz., a line segment passing through the center of the circle or cylinder from one side to the other.

For all other geometrical configurations, the diameter is defined to be the maximum width of the object represented.

From the foregoing definitions it follows and is to be understood that, as used herein, the term "diameter" does not necessarily denote or imply that the object being described is circular or cylindrical.

Figure 1:
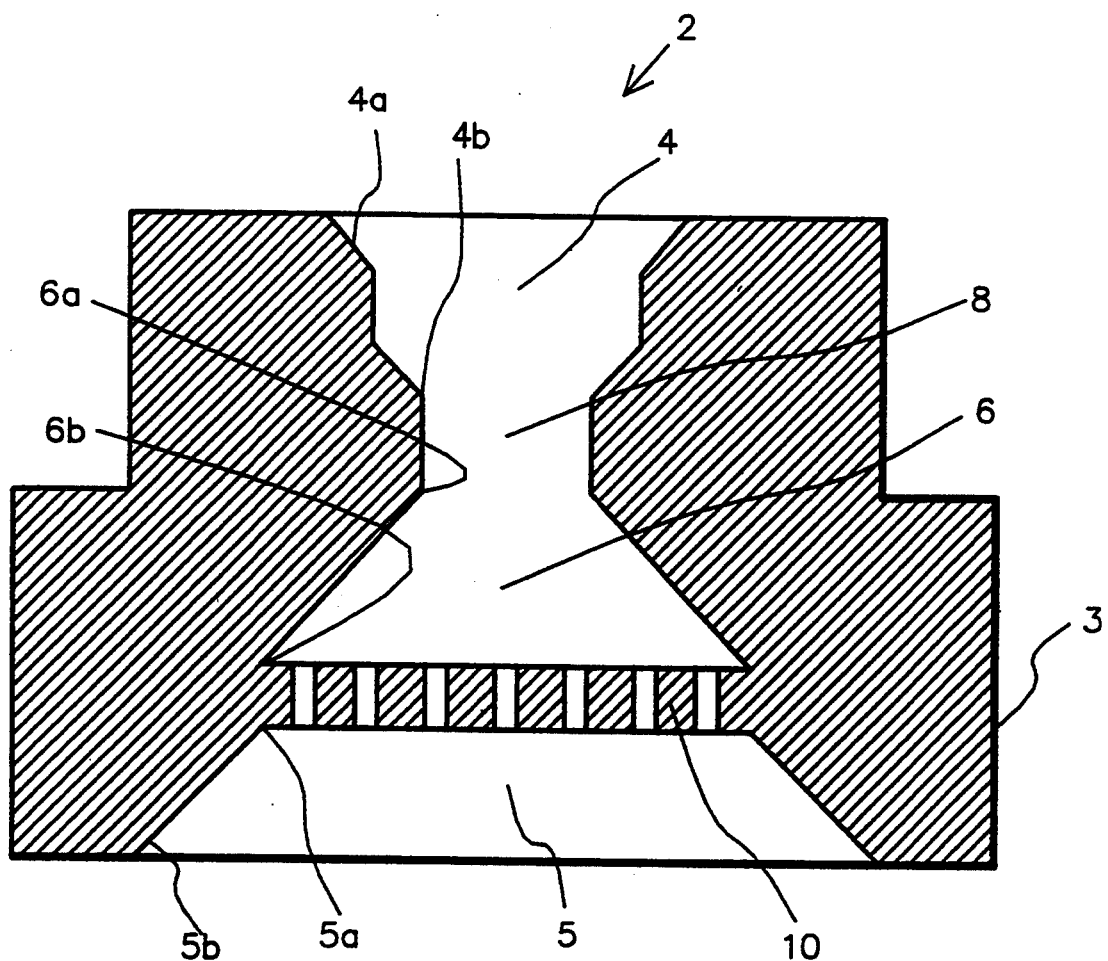
FIG. 1 is a cross-sectional view of a double-sided screen seal made in accordance with the principles of the present invention.

More specifically, reference is made to FIG. 1, in which is shown a double-sided screen seal, made in accordance with the principles of the present invention, and generally designated by the numeral 2.

The screen seal 2 comprises a seal housing 3 in which are disposed a first seal chamber 4 having first and second ends 4a and 4b, respectively; a second seal chamber 5 having first and second ends 5a and 5b, respectively; a convergence chamber 6 having first and second ends 6a and 6b, respectively; a tubular neck 8 connecting the first seal chamber 4 and the convergence chamber 6 to one another; and a screen 10 disposed between the convergence 6 and the second seal chamber 5. Preferably, the tubular neck 8 is of a substantially constant width and cross-sectional area.

Even more specifically, the screen seal 2 comprises a first seal chamber 4 having a conical opening at 4a, a cylindrical middle portion communicating with the conical opening, and a conical end portion at 4b communicating with the cylindrical portion. The opening tapers from wider to narrower in a direction toward the cylindrical portion. The conical end portion tapers from wider to narrower in a direction away from the cylindrical middle portion.

The screen seal 2 further comprises a conical convergence chamber 6, a cylindrical passageway 8 connecting the first seal chamber 4 to the convergence chamber 6, a second seal chamber 5, and a flat perforated member 10 disposed between the convergence chamber 6 and the second seal chamber 5 in a plane perpendicular to the cylindrical passageway 8.

The convergence chamber 6 tapers from wider to narrower in a direction away from the cylindrical passageway 8 and toward the perforated member 10. The second seal chamber 5 tapers from narrower to wider in a direction away from the perforated member 10. The second seal chamber 5 is substantially wider than the first seal chamber 4.

The screen 10 serves a dual purpose and performs dual functions. The first function is to screen out or selectively separate larger particles from smaller particles. The second function which the screen 10 performs is to cause and effect the convergence of any stream passing in either direction through the screen 10 and seal 2. Said convergence is caused and effected by the geometry of the seal 2 and the positioning of the screen 10 within the seal 2. The screen 10 is beneficially made an integral part of the seal housing 3, by fabricating the seal 2 as a single modular unit comprising the seal housing 3 and the screen 10, thereby constraining the entire stream passing through the seal 2 to flow through the screen 10, and preventing any leakage of the stream around and past the screen 10.

Figure 2:
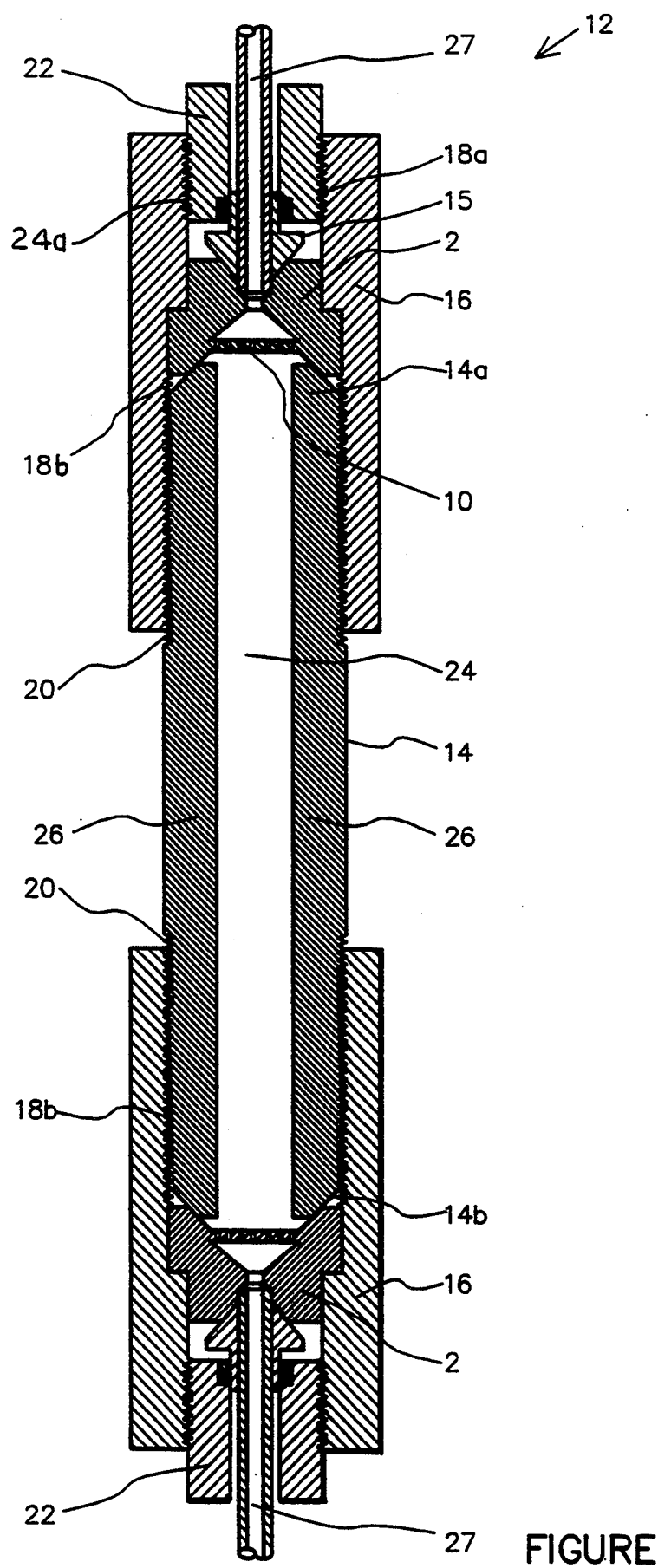
FIG. 2 is a cross-sectional view of a first embodiment of a modular chemical reactor made in accordance with the principles of the present invention.

Reference is now made to FIG. 2, in which is shown a first embodiment of a modular chemical reactor, made in accordance with the principles of the present invention, and generally designated by the numeral 12.

The modular reactor 12 comprises a reactor housing 14 having first and second identical and interchangeable ends 14a and 14b, respectively. First and second modular seal nuts 16 are connected to the first and second ends 14a and 14b of the reactor housing 14. Internal threads 18b on the internal surface of each modular seal nut 16 engage external threads 20 on the external surface of the reactor housing 14, thereby forming a compression seal on the second seal chamber 5 of the first and second double-sided screen seals 2.

External threads 24a on the exterior surfaces of first and second seal nuts 22 engage internal threads 18a on the internal surfaces of the first and second modular seal nuts 16, thereby causing first and second cylinder compression fittings 15 to engage and be compressed against first and second double-sided screen seals 2 in the first seal chambers 4 of the screen seals 2. The fittings 15 are further compressed against first and second feeder tubes 27, thereby sealing the tubes 27.

A central channel 24 runs through the reactor 12 and serves as a reaction chamber. The first and second feeder tubes 27 conduct a fluid reaction mass in either direction through the screen seals 2 and reaction chamber 24. The reaction chamber 24 is circumscribed by a solid annulus 26 which constitutes the wall of the reactor housing 14. A thick wall 26 is required for reactions carried out under moderate or high pressure.

Figure 3:
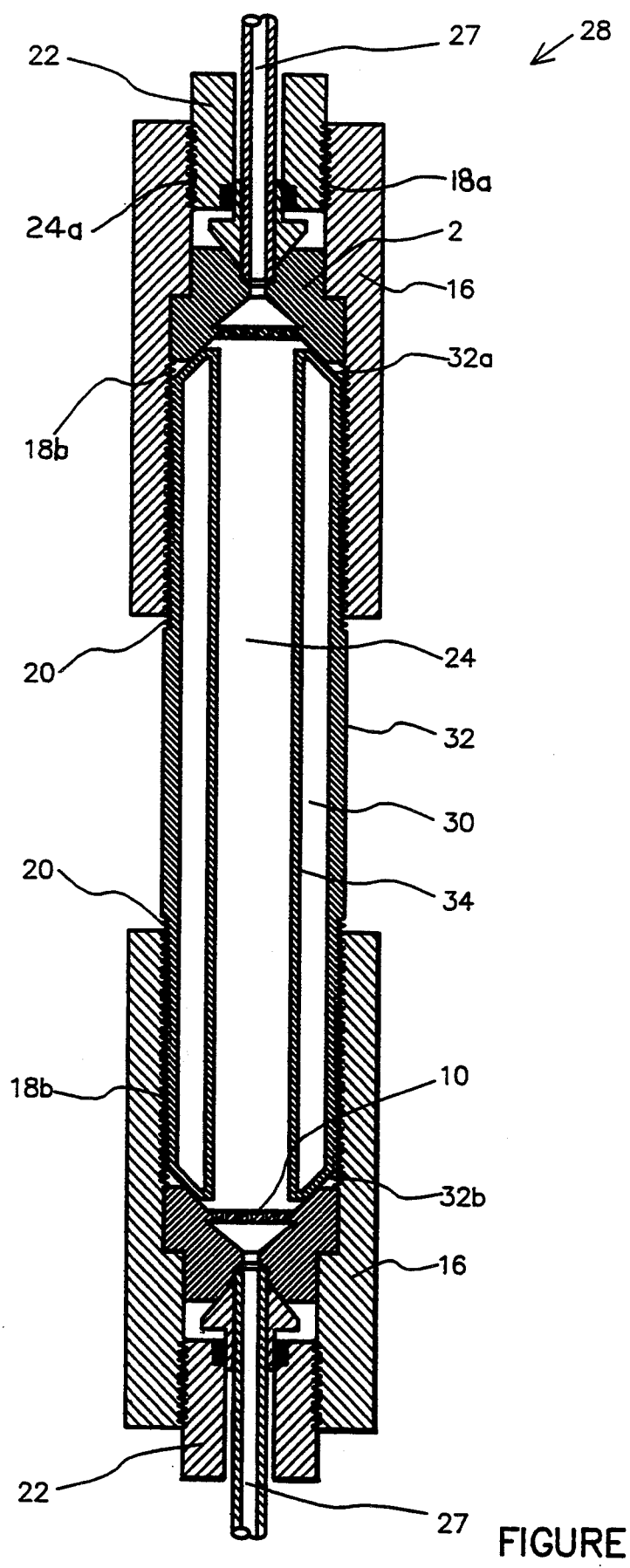
FIG. 3 is a cross-sectional view of a second embodiment of a modular chemical reactor made in accordance with the principles of the present invention.

Reference is now made to FIG. 3, in which is shown a second embodiment of a modular chemical reactor, made in accordance with the principles of the present invention, and generally designated by the numeral 28.

The reactor 28 shown in FIG. 3 differs from the reactor 12 shown in FIG. 2 only by having an annular space 30 instead of a solid annulus 26 between the central channel 24 and the reactor housing 32 having first and second ends 32a and 32b. An inner wall 34 defines the boundaries of the reaction chamber 24. The reactor 28 can be used to carry out reactions at atmospheric pressure, or at pressures slightly above atmospheric.

Either embodiment 12 or 28 of the reactor can be used to carry out batch or continuous-flow reactions at atmospheric pressure or under a negative pressure (partial vacuum).

Preferably, both reactors 12 and 28 are cylindrical. Even more preferably, both reactor housings 14 and 32 and the reaction chambers 24 are cylindrical. Most preferably, the housing 14 and reaction chamber 24 are coaxial, and the housing 32 and reaction chamber 24 are coaxial.

Figure 4:
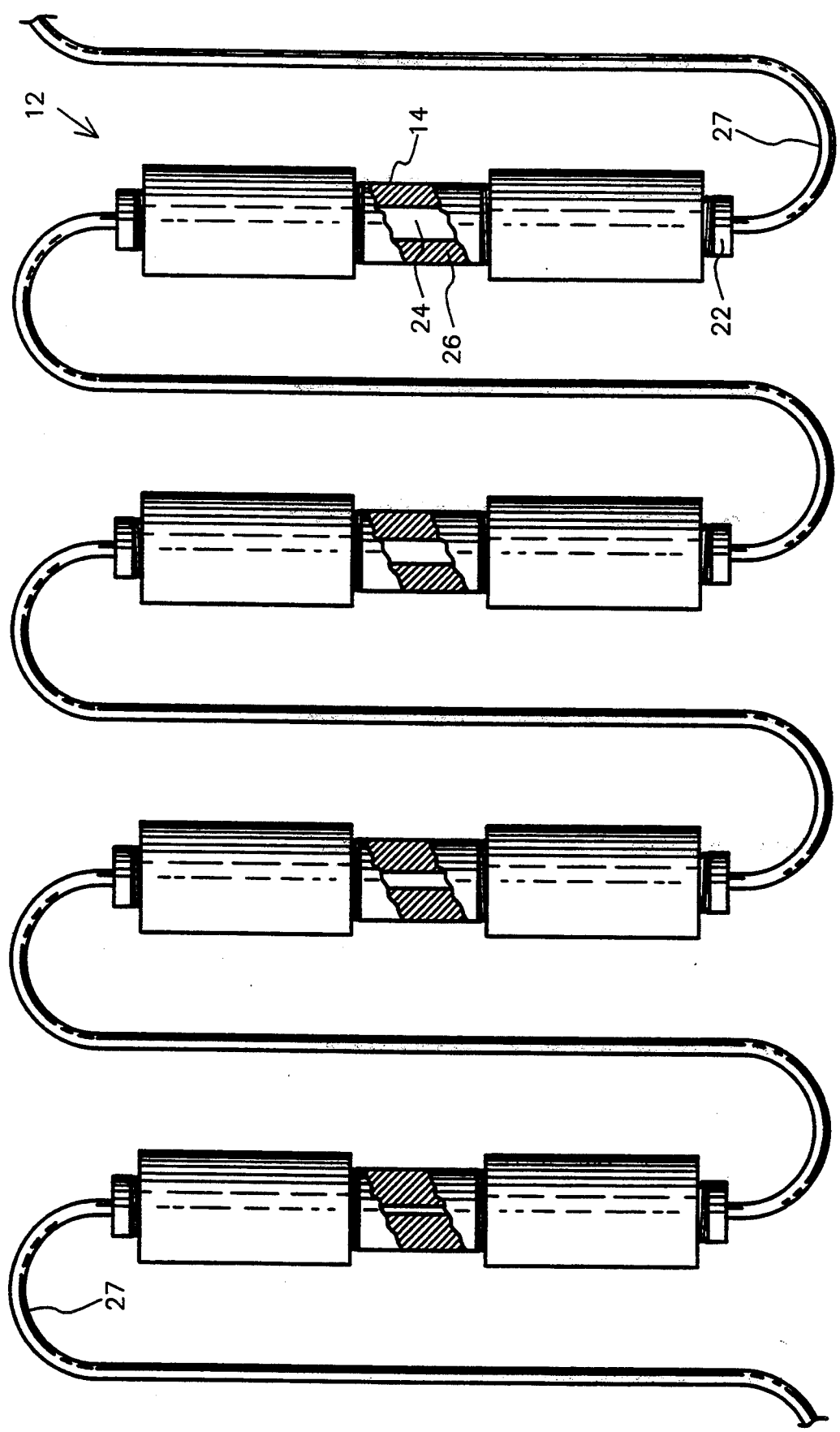
FIG. 4 is an isometric view of a plurality of reactors made in accordance with the first embodiment of the present invention, connected in series.

Reference is now made to FIG. 4, in which is shown a plurality of reactors 12 connected in series. Flow through the feeder tubes 27 may be in either direction. The housings 14 of the reactors 12 are all of the same outside diameter, but the reactor walls 26 differ in thickness, thereby causing the volumes of the reaction chambers 24 to have different values. Viewing the assembly of reactors 12 from left to right, it can be seen that the volumes of the reaction chambers 24 become progressively larger. This means that, for a continuous-flow reaction, the residence times in the reactors 12 become progressively longer. Such an arrangement is beneficial for carrying out a reaction the rate of which decreases with time—a characteristic of virtually all chemical reactions carried out at constant temperature. By suitable choice of chamber volume, the same percentage conversion could, for example, be realized in each reactor 12.

Figure 5:
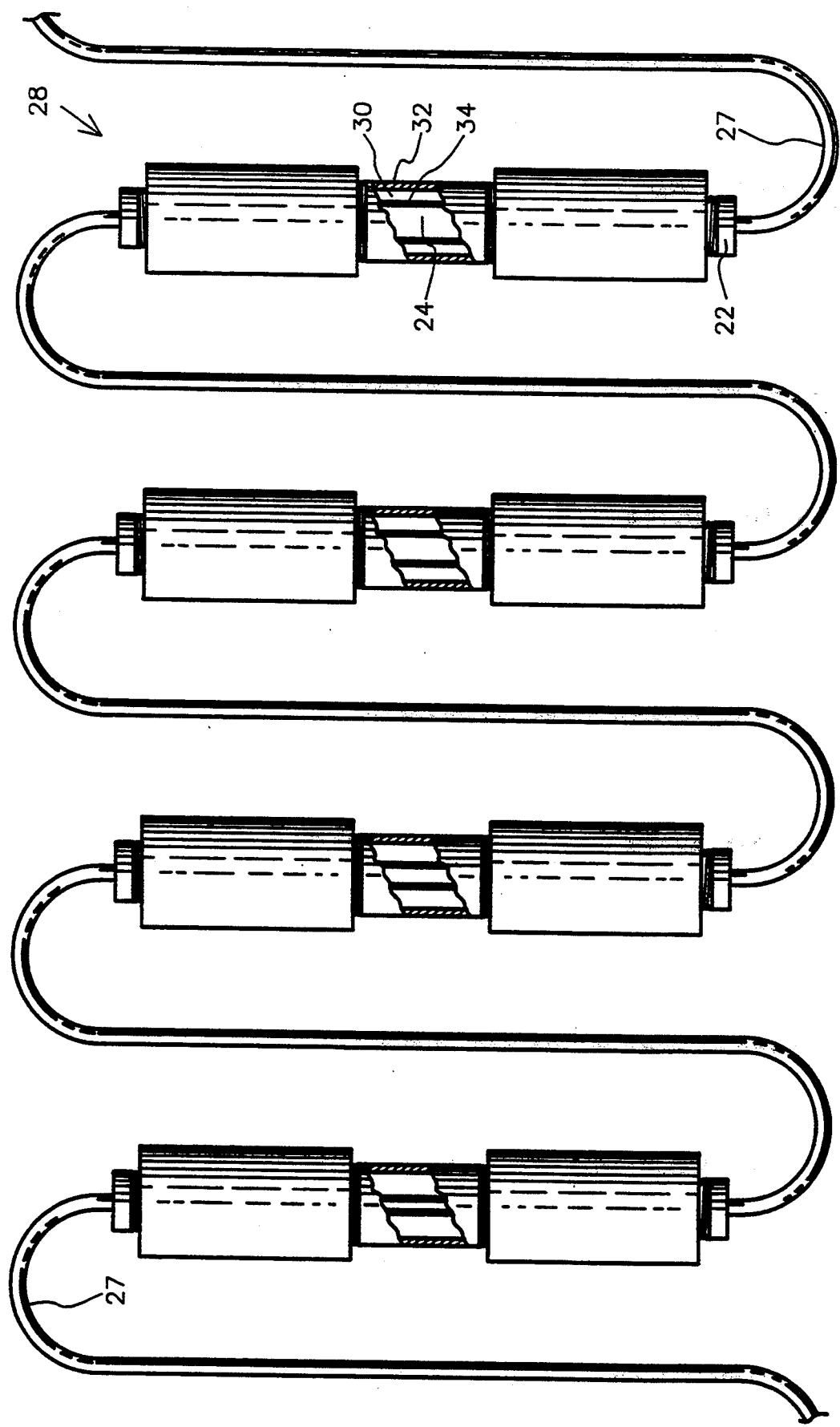
FIG. 5 is an isometric view of a plurality of reactors made in accordance with the second embodiment of the present invention, connected in series.

Reference is now made to FIG. 5, in which is shown a plurality of reactors 28 connected in a similar manner. The same effects and advantages are achieved, in this case by varying the distance between the interior and exterior walls 34 and 32, respectively. Viewing the assembly of reactors 28 from left to right, it can again be seen that the volumes of the reaction chambers 24 become progressively larger.

It will be apparent to those skilled in the art that the volumes of the reaction chambers 24 in reactors 12 and 28 can be varied while maintaining a constant outside diameter of the reactors by varying the length of the reactors.

It will be apparent to those skilled in the art that various kinds of accessory/auxiliary equipment or hardware can and may be utilized in combination with the reactors 12 and 28, as, for example, steam or cooling coils to heat or cool the reactors and reactor contents, thermostats to control the reaction temperature, flowmeters to measure the rate of flow through the reactors, and thermometers or thermocouples to measure reaction temperature.

I claim:

1. A modular chemical reactor, comprising:
   (a) a cylindrical reactor housing having first and second ends;
   (b) a first set of external threads on the external surface of the first end of the reactor housing;
   (c) a cylindrical first modular housing nut having first and second ends, a first middle portion adjacent the first end, and a second middle portion adjacent the second end, the first end of the first housing nut having the same internal diameter as the first middle portion of the first housing nut, the second end of the first housing nut having the same internal diameter as the second middle portion of the first housing nut, the internal diameter of the first end and the first middle portion of the first housing nut being larger than the internal diameter of the second end and the second middle portion of the first housing nut, the external diameters of the first end, second end, first middle portion, and second middle portion of the first housing nut being identical;
   (d) a first set of internal threads on the internal surface of the first housing nut, the first set of internal threads being constructed and arranged to engage the first set of external threads on the external surface of the first end of the reactor housing;
   (e) a first seal nut having first and second ends, the first seal nut being coaxial with the first housing nut;
   (f) a second set of external threads on the external surface of the first seal nut;
   (g) a second set of internal threads on the internal surface of the second end of the first housing nut, the second set of internal threads being constructed and arranged to engage the second set of external threads on the external surface of the first seal nut;
   (h) a cylindrical first seal housing disposed within and contiguous with the first housing nut, the first seal housing having first and second ends;
   (i) a first compression fitting having first and second ends, the first end of the first compression fitting being conical, the second end of the first compression fitting being cylindrical, the first end of the first compression fitting being disposed within the second end of the first seal housing, the second end of the first compression fitting being disposed within the first end of the first seal nut;
   (j) a first screen seal disposed within the first seal housing, the first screen seal comprising
   (k) a first seal chamber having a conical opening in which the first end of the first compression fitting is disposed, a cylindrical middle portion communicating with the conical opening, and a conical end portion communicating with the cylindrical portion, the opening tapering from a larger width to a smaller width in a direction away from the second end of the first seal housing and toward the cylindrical middle portion, the conical end portion tapering from a larger width to a smaller width in a direction away from the cylindrical middle portion;
   (l) a first conical convergence chamber;
   (m) a first cylindrical passageway connecting the first seal chamber to the first convergence chamber;
   (n) a second seal chamber at the first end of the first seal housing;
   (o) a first flat perforated member disposed between the first convergence chamber and the second seal chamber in a plane perpendicular to the first cylindrical passageway;
   the first convergence chamber tapering from a larger width to a smaller width in a direction away from the first cylindrical passageway and toward the first perforated member, the second seal chamber tapering from a smaller width to a larger width in a direction away from the first perforated member, the second seal chamber having a substantially larger width than the first seal chamber;
   (p) a third set of external threads on the external surface of the second end of the reactor housing;
   (q) a cylindrical second modular housing nut having first and second ends, a first middle portion adjacent the first end, and a second middle portion adjacent the second end, the first end of the second housing nut having the same internal diameter as the first middle portion of the second housing nut, the second end of the second housing nut having the same internal diameter as the second middle portion of the second housing nut, the internal diameter of the first end and the first middle portion of the second housing nut being greater than the internal diameter of the second end and the second middle portion of the second housing nut, the external diameters of the first end, second end, first middle portion, and second middle portion of the second housing nut being identical;
   (r) a third set of internal threads on the internal surface of the second housing nut, the third set of internal threads being constructed and arranged to engage the third set of external threads on the external surface of the second end of the reactor housing;
   (s) a second seal nut having first and second ends, the second seal nut being coaxial with the second housing nut;
   (t) a fourth set of external threads on the external surface of the second seal nut;
   (u) a fourth set of internal threads on the internal surface of the second end of the second housing nut, the fourth set of internal threads being constructed and arranged to engage the fourth set of external threads on the external surface of the second seal nut;
   (v) a cylindrical second seal housing disposed within and contiguous with the second housing nut, the second seal housing having first and second ends;
   (w) a second compression fitting having first and second ends, the first end of the second compression fitting being conical, the second end of the second compression fitting being cylindrical, the first end of the second compression fitting being disposed within the second end of the second seal housing, the second end of the second compression fitting being disposed within the first end of the second seal nut;
   (x) a second screen seal disposed within the second seal housing, the second screen seal comprising
   (y) a third seal chamber having a conical opening in which the first end of the second compression fitting is disposed, a cylindrical middle portion communicating with the conical opening, and a conical end portion communicating with the cylindrical portion, the opening tapering from a larger width to a smaller width in a direction away from the second end of the second seal housing and toward the cylindrical middle portion, the conical end portion tapering from a larger width to a smaller width in a direction away from the cylindrical middle portion;

(z) a second conical convergence chamber;

(a') a second cylindrical passageway connecting the third seal chamber to the second convergence chamber;

(b') a fourth seal chamber at the first end of the second seal housing; and (c') a second flat perforated member disposed between the second convergence chamber and the fourth seal chamber in a plane perpendicular to the second cylindrical passageway;

the second convergence chamber tapering from a larger width to a smaller width in a direction away from the second cylindrical passageway and toward the second perforated member, the fourth seal chamber tapering from a smaller width to a larger width in a direction away from the second perforated member, the fourth seal chamber having a substantially larger width than the third seal chamber.

2. A double-sided screen seal for a modular chemical reactor, the seal comprising:

(a) a first seal chamber having a conical opening, a straight cylindrical middle portion communicating with the conical opening, and a conical end portion communicating with the cylindrical portion, the opening tapering from a larger width to a smaller width in a direction toward the cylindrical middle portion, the conical end portion tapering from wider to narrower in a direction away from the cylindrical middle portion;

(b) a conical convergence chamber;

(c) a cylindrical passageway connecting the first seal chamber to the convergence chamber;

(d) a second seal chamber connected to the convergence chamber; and (e) a flat perforated member disposed between the convergence chamber and the second seal chamber in a plane perpendicular to the cylindrical passageway;

the convergence chamber tapering from a smaller width to a larger width in a direction away from the cylindrical passageway and toward the perforated member, the second seal chamber tapering from a smaller width to a larger width in a direction away from the perforated member, the second seal chamber having a substantially larger width than the first seal chamber.

* * * * *